United States Patent
Morgan

[11] 3,890,184
[45]* June 17, 1975

[54] METHOD OF MAKING EXTRUDED RIB BATTERY SEPARATORS

[75] Inventor: Walter A. Morgan, Daytown, Tex.

[73] Assignee: Exxon Research and Engineering Company, Linden, N.J.

[*] Notice: The portion of the term of this patent subsequent to Nov. 20, 1990, has been disclaimed.

[22] Filed: Oct. 12, 1973

[21] Appl. No.: 405,958

Related U.S. Application Data

[63] Continuation of Ser. No. 163,206, July 16, 1971, Pat. No. 3,773,590.

[52] U.S. Cl. ............... 156/244; 136/145; 136/148; 156/160
[51] Int. Cl. .......................................... H01m 3/02
[58] Field of Search ........... 156/160, 161, 164, 178, 156/179, 180, 244; 264/176 F, 210 F, 211, 264/DIG. 75; 136/145, 146, 148, 175

[56] References Cited

UNITED STATES PATENTS

| | | | |
|---|---|---|---|
| 3,084,091 | 4/1963 | Volkman et al. | 136/148 |
| 3,379,811 | 4/1968 | Hartmann et al. | 264/176 F |
| 3,634,573 | 1/1972 | Wagner et al. | 264/176 F |
| 3,755,527 | 8/1973 | Keller et al. | 156/244 |

*Primary Examiner*—Caleb Weston
*Attorney, Agent, or Firm*—David A. Roth

[57] ABSTRACT

Ribs are formed on a nonwoven mat to produce a battery separator. The ribs are formed by extruding a foamed polymer onto the nonwoven mat by extruding the foamed polymer through a multi-hole die as the nonwoven mat follows an arc passing over a mat backup plate. After the ribs have been extruded and the foamed polymer is still soft, the nonwoven mat with the extruded ribs may be passed through a fixed gap such as a pair of calendar rolls to produce a battery separator of uniform thickness.

4 Claims, 5 Drawing Figures

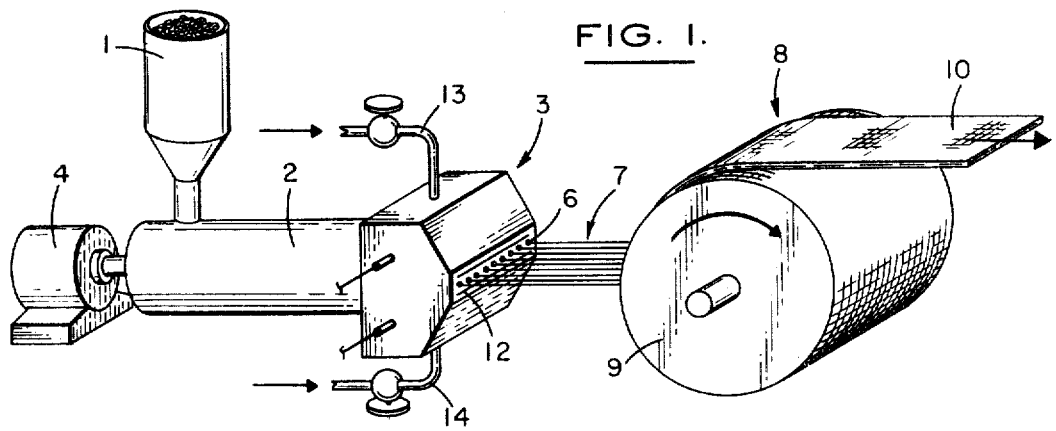
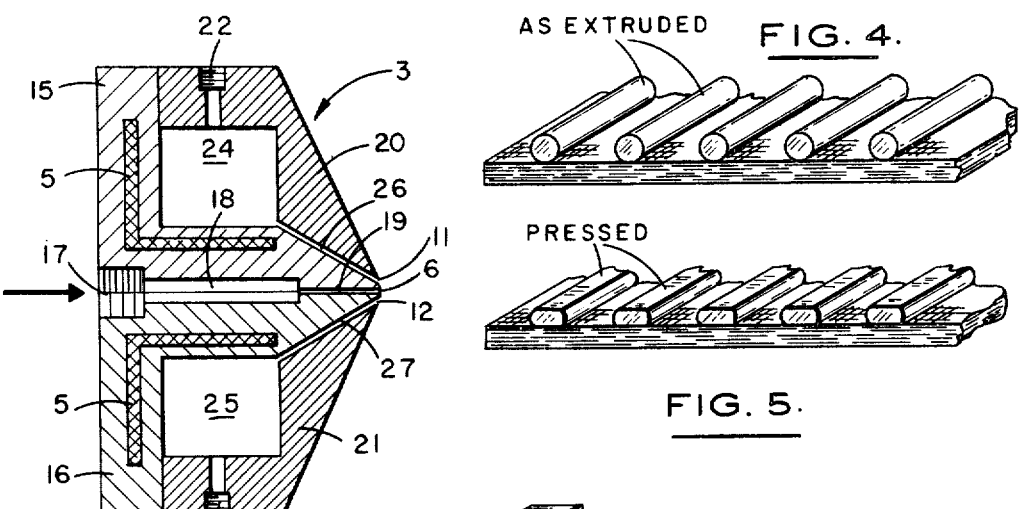
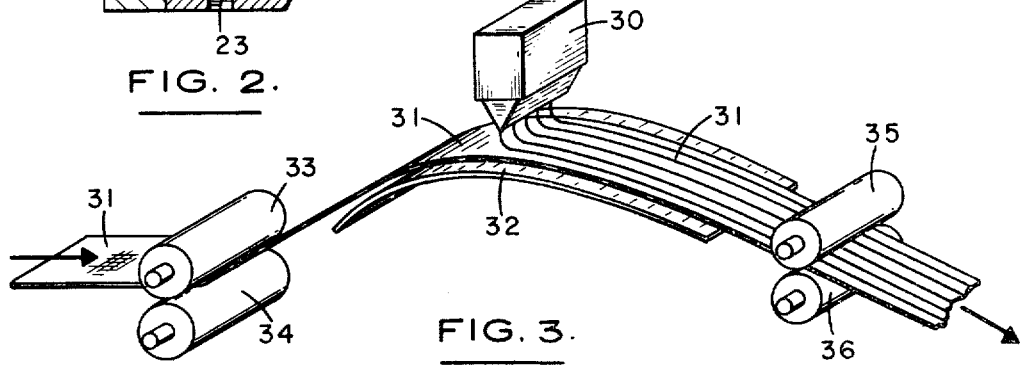

METHOD OF MAKING EXTRUDED RIB BATTERY SEPARATORS

This is a continuation of application Ser. No. 163,206, filed July 16, 1971, now U.S. Pat. No. 3,773,590.

BACKGROUND OF THE INVENTION

1. Field of the Invention.

The present invention is directed to a nonwoven battery separator. More particularly, the present invention relates to a method of forming ribs on a battery separator which comprises extruding a foamed polymer onto the nonwoven mat through a multi-hole die as the nonwoven mat passes over a mat backup plate.

2. Prior Art.

Battery separators made from polyolefins, specifically polypropylene, are illustrated in the following U.S. Pat. Nos.

| U.S. 3,002,040 | U.S. 3,092,438 |
| U.S. 3,026,366 | U.S. 3,216,864 |
| U.S. 3,045,058 | U.S. 3,314,821 |
| U.S. 3,055,966 | U.S. 3,351,495 |
| U.S. 3,084,091 | U.S. 3,354,247 |

SUMMARY OF THE INVENTION

The present invention is directed to nonwoven mats composed of randomly laid fibers having an average diameter of less than 10 microns and having a maximum pore size of less than 40 microns which is suitable as a battery separator having extruded thereon ribs of a foamed polymer. The battery separators of the present invention exhibit improved abrasion resistance, compressive strength, stiffness perpendicular to the ribs, and thickness uniformity over the materials previously used as battery separators. The battery separators of the present invention are preferably produced by a melt-blowing process which comprises extruding a polymer such as polypropylene, polystyrene or mixtures thereof, through a die into a heated air stream which attenuates the fibers to produce fine fibers and collecting these fibers on a moving screen in the form of a mat. The nonwoven mat is then compacted to produce the nonwoven structure of the present invention which is usable as a battery separator. More specifically, the present invention is directed to forming ribs on such a nonwoven structure by extruding a foamed polymer onto the nonwoven mat as it passes directly beneath a multi-hole die as the nonwoven mat follows an arc as it passes over a backup plate. The purpose of extruding the foamed polymer as the nonwoven mat passes over the arc of the web backup plate is to compensate for the shrinkage in the foamed polymer as it solidifies. While the rib material is still soft, the nonwoven mat with extruded ribs may be passed between a pair of calender rolls having a fixed gap so that the finished battery separator has the desired and uniform overall thickness.

BRIEF DESCRIPTION OF THE DRAWINGS

FIG. 1 is a schematic view of the overall melt-blowing process;

FIG. 2 is a cross-sectional view of a die used in the melt-blowing process;

FIG. 3 is a schematic view of extruding a foamed polymer onto a nonwoven mat to produce a batter separator;

FIG. 4 is a schematic view of a battery separator having extruded ribs as extruded; and FIG. 5 is a schematic view of a battery separator having extruded ribs and pressed.

DESCRIPTION OF THE PREFERRED EMBODIMENTS

Referring to FIG. 1 of the drawings, polypropylene, which is the preferred material although polystyrene or mixtures of polystyrene and polypropylene may be used, is introduced into a pellet hopper 1 of an extruder 2. The polypropylene used in the present invention has either been thermally treated before being introduced into the extruder 2 or is thermally treated in the extruder 2 and/or die head 3. According to the present invention, the polypropylene is added into the hopper 1 and then is heated in extruder 2 at temperatures in excess of 600° F. and preferably within the range of 620° to 800° F. After thermal treatment, the polypropylene is forced through the extruder 2 by a drive motor 4 into the die head 3. The die head 3 may contain a heating plate 5 which may also be used in the thermal treatment of the polypropylene before it is melt-blown. The polypropylene is then forced out a row of die openings 6 in the die head 3 into a gas stream which attenuates the polypropylene into fibers 7 which are collected on a moving collecting device 8 such as a drum 9 to form a continuous mat 10. The gas stream which attenuates the polypropylene is supplied through a gas jet 11 and 12, respectively. These gas slots 11 and 12 are supplied with a hot gas, preferably air, by gas lines 13 and 14, respectively.

The melt-blowing process may be further understood by considering the details of the die head 3 which is set forth in cross-section in FIG. 2. The polypropylene is introduced into the back of the die plates 15 and 16 through an inlet 17. The polypropylene then goes into a chamber 18 between the upper and lower die plates 15 and 16, respectively. The facing of the die plate 16 has milled grooves 19 which terminate in the die openings 6. It is understood, of course, that the mill grooves may be in the lower die plate 16, in the upper die plate 15, or grooves may be milled in both plates 15 and 16. An upper gas cover plate 20 and a lower gas cover plate 21 are connected to the upper die plate in lower die plate 15 and 16, respectively. The hot gas is supplied by inlets 22 in upper air plate 20 and lower inlet 23 in lower gas plate 21. Suitable baffling means (not shown) may be provided in both the upper air chamber 24 and lower air chamber 25 to provide a uniform flow of air through the gas slots 26 and 27, respectively. As shown in FIG. 2, the rear portion of the die head 3 may contain heating means 5 for heating both the polymer and air in the die head 3.

The gas flow is controlled so that the fibers as they are attenuated do not come into contact one with the other which results in "rope" and fiber bundles. The gas, preferably air, is heated and the flow controlled to produce very fine fibers (less than 10 microns). Suitable polypropylene mats have been obtained at air rates between 0.7 and 4 pounds/minute and the polypropylene fibers are attenuated in the gas stream at those rates such that their average diameter is between one to about 10 microns.

The fibers are collected as a selfsupporting mat on a collecting device such as a rotating drum at distances of about 1 to 18 inches from the die openings. Preferably a mat of self-bonded fibers is collected at a distance between 3 to 8 inches. A "self-bonded" mat as used herein means that the mat is a coherent, integral structure capable of withstanding normal handling such as winding, unwinding, cutting, pressing, calendering, etc. without losing its essential mat-like character. In most mats used in the present invention, some theremal bonding occurs. The mat produced by the melt blowing process is produced so as to have a basis weight of between 60 and 500 grams/square meter. The thickness of the nonwoven mat may vary between 20 and 200 mils.

To produce a battery separator from the nonwoven mat produced by the melt-blowing process, the mat must be compacted to obtain the desired thickness and porosity, as well as the mechanical properties of strength and abrasion resistance. The nonwoven mat is compacted to a thickness of between 10 and 40 mils to be useful as a battery separator in most batteries. Compacting is preferably carried out by a thermal compacting operation utilizing calender rolls or a press to obtain the nonwoven mat of fixed thickness.

Referring to FIG. 3 of the drawing, a multi-hole die 30 is positioned over the nonwoven mat as the mat 31 passes over a backup plate 32. The multi-hole die 30 is fed with molten polymer preferably containing a foaming agent. The polymer used to form the rib is preferably of the same polymer as used in making the nonwoven mat, for example if the nonwoven mat 31 is made of polypropylene fibers the polymer used to form the ribs is also of polypropylene. However, other thermoplastic polymers may be used to form the ribs. The foaming agent used may be one compatible with the particular polymer used to form the ribs. For example, suitable foaming agents are 1,1'-azobisformamide (azodicarbonamide), p-toluene sulfonyl semicarbozide, 4,4'-oxybis (benzene sulfonyl hydrazide) and when polypropylene is used 1,1'-azobisformamide (azodicarbonamide) is preferred. The polymer and foaming agent are introduced to a screw extruder (not shown) wherein the polymer is melted and forced into and through the multi-hole die 30 to extrude the desired number of ribs onto the nonwoven mat 31.

The multi-hole die 30 is positioned over the nonwoven mat 31 so that the axis of the line of holes in the die 31 is normal to the direction of mat motion and the hole spacing in the die 30 is equal to the desired rib spacing. Directly beneath the multi-hole die 30, the nonwoven mate 31 follows an arc as it passes over the mat backup plate 32. The amount of curvature in the backup plate 32 will vary depending upon the specific polymer and foaming agent used and the extrusion temperatures for producing the foamed polymer ribs. The purpose of the arc in backup plate 32 is to compensate for the shrinkage which takes place in the foamed polymer as it soldifies.

The nonwoven mat 31 is passed through fixed gap compacting calender rolls 33 and 34 before the foamed polymer is extruded onto the nonwoven mat 31. However, while the extruded polymer ribs are still soft, the nonwoven mat with the extruded ribs may be passed between a pair of calender rolls 35 and 36, which have a fixed gap so as to produce a finished battery separator having a uniform overall thickness.

The present invention will be further illustrated by the following specific examples which are given by way of illustration and not as limitations on the scope of the invention.

EXAMPLE 1

Nonwoven polypropylene mats were produced by the melt-blowing process under the following conditions:

| Resin | 33.6 melt flow rate |
|---|---|
| Die Temp. °F. | 580 |
| Air Temp. °F. | 644 |
| Polymer Rate gm/min. | 7.9 |
| Air Rate No./min. | 1.27 |
| Collector distance in. | 6.0 |
| RPM | 1.0 |

The polypropylene fibers in the mats produced were of a diameter of 2 microns or less. The basis weight of mats so produced varied from 256 to 270 grams per square meter. These mats were compacted to a thickness of 20 to 30 mils.

EXAMPLE 2

A polypropylene nonwoven mat produced according to Example 1 was passed over a backup plate having an arc of approximately 2 to 6 inches radius. Directly over the arc was die having equally spaced holes and fed by an extruder to force through the holes strands of polypropylene and a foaming agent, 1,1'-azobisformamide (azodicarbonamide). Polypropylene (99.75% by weight) was mixed with the foaming agent (0.25% by weight), preferably with a minor amount of white oil to aid in mixing the small amount of foaming agent throughout the pellets of polypropylene, and extruded at a temperature of 420° F. at a rate of 0.5 lbs/hr./hole with a nonwoven mat speed of 25 ft./min. The strand of extrudate was 40 mils and had a density of 0.61 grams/cc. The nonwoven mat and extrudate were passed through calender rolls so that after passing through the fixed gap the dimensions of the extrudate ribs were about 0.030 inches high and 0.048 inches wide.

The foregoing examples are illustrative of the present invention in that polystyrene or blends of polypropylene and polystyrene have been melt-blown to produce mats which were compacted into suitable battery separators in the same manner as the polyporopylene nonwoven mats of the examples. Likewise, a different thermoplastic may be extruded onto the nonwoven mat to provide the extruded ribs.

The nature and object of the present invention having been completely described and illustrated and the best mode thereof contemplate set forth, what I wish to claim as new and useful and secure by Letters Patent is:

1. A method for forming a ribbed battery separator from a gas laid nonwoven mat of polyolefin fibers having an average diameter of less than 10 microns which comprises:

passing said gas laid nonwoven mat of polyolefin fibers having an average diameter of less than 10 microns through a fixed gap between compacting calender rolls and compacting said mat to a maximum pore size of less than 40 microns, thereafter passing said mat over a backup plate having a portion that follows an arc, and extruding a foamed molten thermoplastic polymer through a multihole die onto said mat to form ribs on said mat as it follows said arc to compensate for shrinkage in the foamed polymer as it solidifies.

2. The method of claim 1 wherein after said ribs have been formed said ribbed mat is passed between a pair of fixed gap calender rolls to provide a battery separator having a uniform overall thickness.

3. The method of claim 2 wherein said polyolefin fibers having an average diameter of less than 10 microns is comprised of a polymer of propylene or polymer of styrene.

4. The method of claim 3 wherein said foamed molten thermoplastic polymer is comprised of polyolefin.

* * * * *